UNITED STATES PATENT OFFICE.

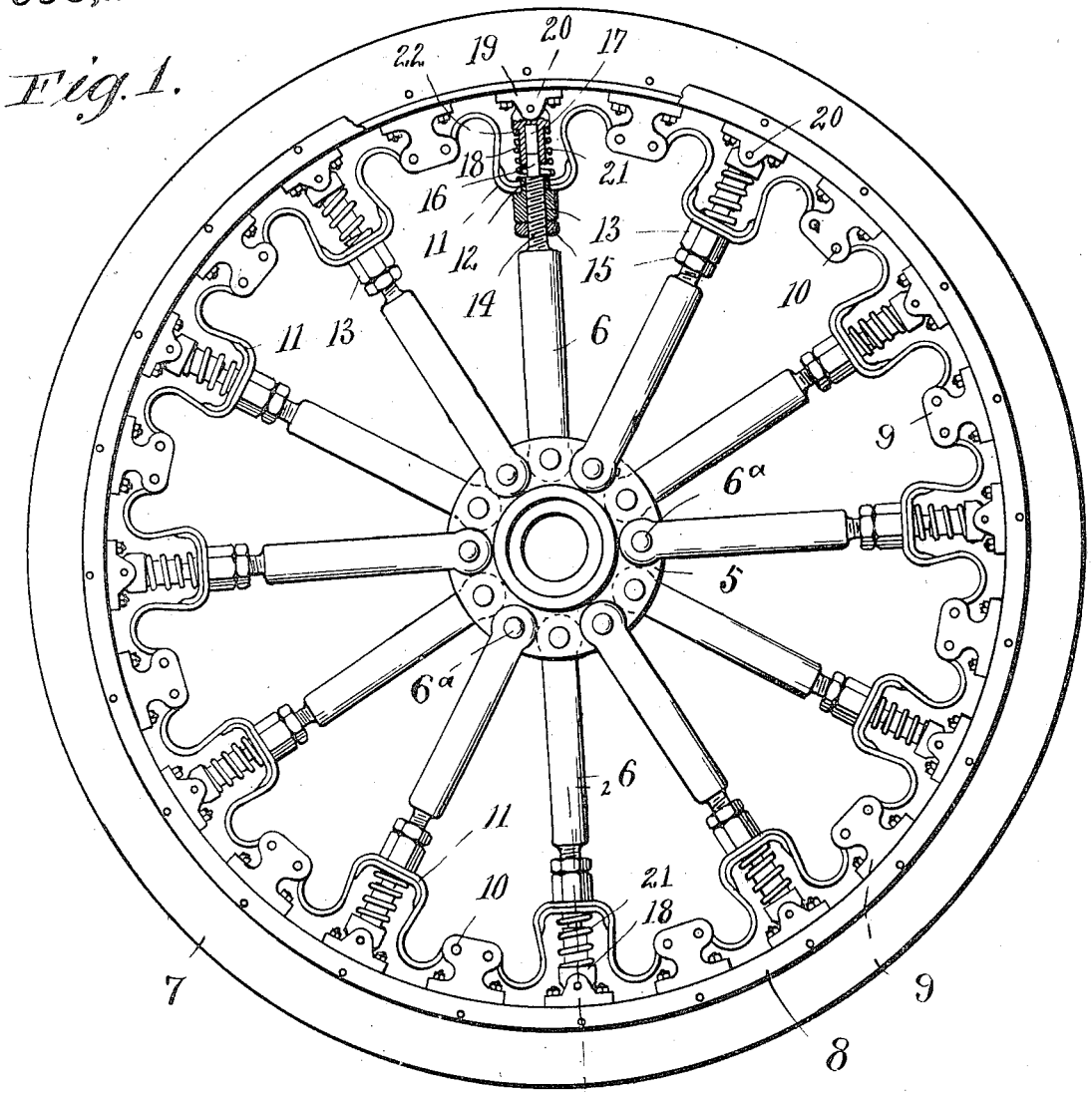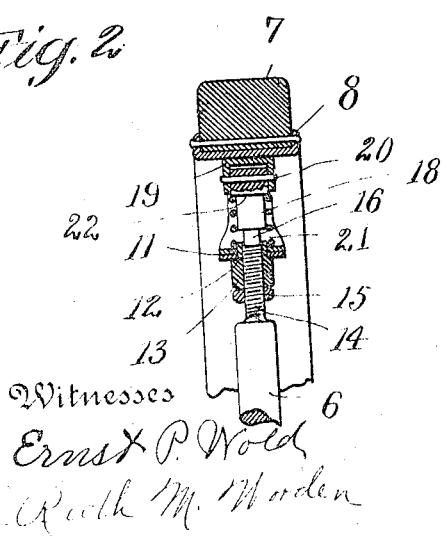

JOHN F. ARNOLD, OF WATERBURY, CONNECTICUT.

SPRING-WHEEL.

993,285.  Specification of Letters Patent.  Patented May 23, 1911.

Application filed September 20, 1910. Serial No. 582,933.

*To all whom it may concern:*

Be it known that I, JOHN F. ARNOLD, citizen of the United States, and resident of Waterbury, in the county of New Haven and State of Connecticut, have invented certain new and useful Improvements in Spring-Wheels, of which the following is a specification.

My invention relates to vehicle wheels such for instance as are used on automobiles, trucks and the like and refers partly to a spring or cushion wheel of the above class.

It is the object of the invention to provide a wheel upon which a solid rubber or steel tire can be employed and yet wherein a cushion effect is obtained, producing a flexible wheel that will have all the advantages of an inflate or pneumatic rubber tire, without being liable to the possibility of punctures, blowouts, and other annoyances incident thereto.

To the above purpose, my invention consists of certain novel features of construction and arrangement of parts, which will be hereafter more fully set forth, pointed out in the claim, and illustrated in the accompanying drawings forming a part of this specification and upon which—

Figure 1 shows a side elevation of my improved form of cushion wheel, one spoke portion of which is broken away and shown in longitudinal section. Fig. 2 is a cross section taken on line 2—2 of Fig. 1. Fig. 3 is a detailed end view of one of the clips to which the ends of the flat springs are attached.

Referring by numerals to the accompanying drawings 5 designates the hub of the wheel to which a series of spokes 6 are flexibly connected by means of pins 6$^a$. The spokes are alternately attached to the opposite sides of the hub and extend out radially from the hub at an equal distance apart in the usual way; 7 represents the tire proper, 8 the rim which serves to support the tire in place and in which the outer ends of the spokes are indirectly connected. To the rim 8 is secured a series of brackets 9 that are arranged midway between the end portions of the spokes and are provided with pins 10 on either side for the pivoted attachment of the ends of a special form of flat spring 11. These springs are made of sheet metal and preferably constructed of two or more leaves of suitable length to reinforce and strengthen the springs at the desired points.

The spring is provided with a central hole 11$^a$ in which is seated the extended sleeve 12 of a nut 13 threadably attached to a reduced thread end 14 of the before mentioned spokes 6. A jam nut 15 is also applied to the reduced thread end portion of the said spokes and serves to abut against the before mentioned nut 13 in a manner to lock the same in the particular position to which it has been adjusted. The shoulder of the said nut 13 surrounding the sleeve 12 is seated against the side of the flat spring pressing the latter out against the resistance of the before mentioned pins 10 to which the ends of the spring 11 are attached. The load of the wheel is thus carried largely upon the said spring 11 which obviously serves to give, with the vibration of the wheel in the desired manner. The spokes 6 are further provided with a second reduced outer end portion 16 that fits into a socket 17 of a cylindrical shouldered guide piece 18 pivotally attached to a coil 19 secured to the inner face of the rim 8 by means of a pin 20 as shown. A spiral spring 21 is arranged upon the guide piece and extension 16 with one end of the spring seated against the shoulder 22 of the guide piece and the other end seated upon the under side of the spring 11. This spring operates as an adjunct to the main spring 11 and serves to assist in carrying the load and partially to form a resistance for the final yield of the spoke when shoved out toward the rim.

The construction of the wheel is such that the springs of the several spokes may readily be adjusted by means of the main nut and jam nut, to bring the hub positively central within the rim, and likewise to bring about any desired tension upon the springs so as to make the wheel more or less sensitive as may be desired according to the style of the vehicle upon which it is to be used and likewise the load to be carried thereby. It will further be apparent that in the operation of this wheel the springs of the several spokes work in unison and all yield in one direction or another more or less during the operation of the wheel under a load and that as a result no one or two of the sets of springs have to be relied upon to support the load, thereby distributing the weight uniformly throughout. It will also be noted that the respective sets of parts employed in connection with each spoke are duplicates of each other and are in that sense interchangeable, and further that the construction is such that it will enable the ordinary user to readily remove a broken one of such parts while on the road and substitute another new and similar part with little or no difficulty and comparatively no loss of time.

What I claim and desire to secure by Letters Patent is—

A vehicle wheel, comprising a hub, rim and spokes, said spokes having a reduced threaded end, a flat spring having a hole midway of its length and having its two end portions pivotally connected to the rim and midway between the spokes, a nut mounted upon the threaded portion of the spokes having a shoulder seated against the spring and an extension that passes through the hole of the spring, and a guide pivotally connected to the rim and into which a reduced end of the spoke operates.

Signed at Waterbury in the county of New Haven and State of Connecticut this 14th day of Sept. A. D., 1910.

JOHN F. ARNOLD.

Witnesses:
EDWARD L. SEERY,
EDWIN W. BIGGERSTULL.